US 6,751,278 B2

(12) United States Patent
Cho

(10) Patent No.: US 6,751,278 B2
(45) Date of Patent: Jun. 15, 2004

(54) LOOP ERROR DETECTOR FOR USE IN A PN CODE TIMING TRACKING LOOP

(75) Inventor: Mi-Young Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 435 days.

(21) Appl. No.: 09/964,174

(22) Filed: Sep. 26, 2001

(65) Prior Publication Data

US 2002/0061084 A1 May 23, 2002

(30) Foreign Application Priority Data

Sep. 27, 2000 (KR) .......................... 2000-56739

(51) Int. Cl.[7] ............................................. H04L 7/00
(52) U.S. Cl. .................... 375/367; 375/130; 375/137
(58) Field of Search ................................. 375/130, 140, 375/146, 147, 134, 137, 367

(56) References Cited

U.S. PATENT DOCUMENTS 6,678,312 B1 * 1/2004 Mohindra .................... 375/150

2002/0034218 A1 * 3/2002 Papasakellariou et al. .. 375/148

* cited by examiner

Primary Examiner—Temesghen Ghebretinsae
(74) Attorney, Agent, or Firm—Dilworth & Barrese LLP

(57) ABSTRACT

A loop error detector for use in a Pseudo Noise (PN) code timing tracking loop is disclosed. A first multiplexer receives an early I-channel signal and an early Q-channel signal, and alternately selects the received early I and Q-channel signals at a ½-chip period. A first accumulator accumulates the early I and Q-channel signals multiplexed by the first multiplexer for a specific chip period. A second multiplexer receives a late I-channel signal and a late Q-channel signal, and alternately selects the received late I and Q-channel signals at a ½-chip period. A second accumulator accumulates the late I and Q-channel signals multiplexed by the second multiplexer for the specific chip period. An operator calculates a sum and a difference of the early and late I-channel signals accumulated by the first and second accumulators, calculates a sum and a difference of the early and late Q-channel signals, and multiplies the sums by the differences. An adder adds values obtained by multiplying the sums by the differences and outputs the added value as a loop error signal.

2 Claims, 4 Drawing Sheets

LOOP ERROR DETECTOR FOR USE IN A PN CODE TIMING TRACKING LOOP

PRIORITY

This application claims priority to an application entitled "Loop Error Detector for Use in a PN Code Timing Tracking Loop" filed in the Korean Industrial Property Office on Sep. 27, 2000 and assigned Serial No. 2000-56739, the contents of which are hereby incorporated by reference.

BACKGROUND OF THE INVENTION

1. Field of the Invention

The present invention relates generally to Code Division Multiple Access (CDMA) radio communication, and in particular, to a loop error detector for use in a Pseudo Noise (PN) code timing tracking loop.

2. Description of the Related Art

In a CDMA communication system, mobile stations must initially restore the timing of signals transmitted from a base station in order to receive the transmitted signals. To accomplish this, the CDMA communication system performs a timing acquisition and tracking using a PN code sequence. After a coarse timing acquisition of, for example, 1 or a ½ chip is performed through a code search operation, a fine timing tracking operation of, for example, ⅛ chip is initiated. This fine timing tracking operation is typically performed using a code tracking loop with a secondary loop filter.

A conventional code tracking loop typically employs a Tau-Dither Tracking Loop (TDL) structure with a secondary loop filter rather than a Double Dither Tracking Loop (DDL) structure. The reason for not using the DDL structure in spite of its good noise characteristics and even performance in terms of other characteristics, is because it increases the hardware size and although it satisfies the required performance of the conventional radio communication system, which services only the voice, it does so at a relatively lower moving speed. In order to provide a high-speed data service at the higher moving speed of the user as in an IMT-2000 system, a timing tracker is required which is stable against noises and has an improved performance. To this end, many attempts have been made to utilize the DDL structure and a third loop filter.

The conventionally employed TDL tracking loop structure is illustrated in FIG. 1. Referring to FIG. 1, a correlation between a received signal s(t) and an early PN code PN_R or a late PN code PN_L generated by a PN code generator 18, the PN codes PN_R and PN_L having a ½-chip phase difference, is calculated by a selector 20, a multiplier 10, and accumulators 22 and 24 in a loop error detector 12. The early PN code PN_R and the late PN code PN_L are expressed by Equations (1) and (2), respectively, and the received signal is expressed by $s(t)=S_I(t)+jS_Q(t)$. In the following equations, $T_d$ indicates chip time.

$$C\left(t+\frac{T_d}{2}\right)=C_I\cdot\left(t+\frac{T_d}{2}\right)+jC_Q\cdot\left(t+\frac{T_d}{2}\right) \quad (1)$$

$$C\left(t-\frac{T_d}{2}\right)=C_I\cdot\left(t-\frac{T_d}{2}\right)+jC_Q\cdot\left(t-\frac{T_d}{2}\right) \quad (2)$$

The selector 20 selects the early PN code PN_R and the late PN code PN_L according to a q(t) signal and provides the selected PN code to the multiplier 10. The selecting period includes N chips and is determined in association with a symbol period at the lowest data rate used and a Walsh code period for channel separation. The q(t) signal applied to the selector 20 is toggled between '1' and '−1' at a period of N chips. The PN code calculated in this method is complex-multiplied by the received signal by the multiplier 10, to despread the received signal. An in-phase signal or I-channel signal $R_I(t)$ and a quadrature-phase signal or Q-channel signal $R_Q(t)$ of an output signal, $R(t)=R_I(t)+jR_Q(t)$, of the multiplier 10 are correlated for an N-chip period by the accumulators 22 and 24, respectively, as expressed by Equations (3-1) and (3-2) below. In the following equations, "N" is the chip period of a PN sequence and "k" is N−1.

$$I(t)=\frac{1}{k}\cdot\sum_{n=0}^{N}R_I(n) \quad (3\text{-}1)$$

$$Q(t)=\frac{1}{k}\cdot\sum_{n=0}^{N}R_Q(n) \quad (3\text{-}2)$$

To calculate signal power, squarers 26 and 28 square I(t) and Q(t), respectively, and then, an adder 30 adds the squared values. An output signal A(t) of the adder 30 is updated at the period of N chips, and a subtracter 32 calculates a difference between the power of the late phase signal and the power of the early phase signal by calculating a difference between the present value A(t) and a previous value A(t−1) determined for the previous N-chip period. Thereafter, the calculated power difference is multiplied by a −q(t) signal by a multiplier 34 and is output as a loop error signal e(t).

The calculated loop error signal e(t) is corrected, through a secondary loop filter 14 and a voltage controlled oscillator (VCO) 16, by a reference timing error value for the loop error value of the loop error signal e(t). The PN code generator 18 generates a PN code at every chip in response to the error-corrected timing signal. Such a PN code generator 18 is comprised of an N-stage Left Feedback Shift Register (LSFR).

The accumulators 22 and 24, the squarers 26 and 28, the adder 30, the subtracter 32 and the multiplier 34 constitute the loop error detector 12 for detecting a TDL phase error. Such a loop error detector, as illustrated in FIG. 2, can also be comprised of accumulators 36 and 38, a multiplexer 40, a squarer 42, an adder 44, a subtracter 46 and a multiplier 48.

Unlike the loop error detector of FIG. 1 which calculates $I(t)^2$ and $Q(t)^2$ for N chips using the two squarers 26 and 28, the loop error detector of FIG. 2 first calculates $I(t)^2$ using a multiplexer 40 for alternately selecting I(t) and Q(t), and one squarer 42, and then calculates $Q(t)^2$; or first calculates $Q(t)^2$ and then calculates $I(t)^2$. By doing so, the loop error detector of FIG. 2 decreases the number of the squarers to one. The succeeding procedure, in which the sequentially calculated $I(t)^2$ and $Q(t)^2$ are added by the adder 44 and the loop error signal e(t) is calculated by the subtracter 46 and the multiplier 48, is equivalent to the procedure described in FIG. 1.

A conventional DDL tracker is illustrated in FIG. 3, in which the secondary loop 14, the VCO 16 and the PN code generator 18 are identical to those in FIG. 1 but a loop error detector 54 is different from the TDL loop error detector 12 of FIG. 1. While the TDL loop error detector 12 calculates the early phase signal level and the late phase signal level with a predetermined time lag, the DDL loop error detector 54 simultaneously measures the two signal levels at the same time point. The DDL tracker of FIG. 3 has double the hardware structure, since it includes multipliers 50 and 52, accumulators 56–62, squarers 64–70, and adders 72 and 74, while the TDL tracker of FIG. 1 includes only the multiplier 10, the accumulators 22 and 24, the squarers 26 and 28, and the adder 30. In FIG. 3, the multipliers 50 and 52 perform complex multiplication for dispreading an input signal s(t) as in the multiplier 10 of FIG. 1. The complex multiplication is simultaneously performed on both the early PN code PN_R and the late PN code PN_L. The input signal s(t) is applied equally to the early PN code PN_R and the late PN code PN_L, contributing to the improvement of a balance property between the early signal and the late signal. The respective phase signals R1(t) and R2(t) are accumulated by the accumulators 56–62 for N chips to calculate correlations, squared by the squarers 64–70, and then, added by the adders 72 and 74. As a result, the adder 72 determines a level of an early signal A1(t) and the adder 74 determines a level of a late signal A2(t). A level difference between the determined signals A1(t) and A2(t) is calculated by a subtracter 76, and the determined level difference becomes a loop error signal e(t). It is noted from the foregoing description that the DDL loop error detector 54 of FIG. 3 has twice the hardware complexity of the TDL loop error detector of FIG. 2.

As described above, the conventional timing trackers for use in the radio voice communication system employs the TDL structure. However, the future high-speed radio data service system requires improved noise-suppression capability. In addition, in calculating an energy difference between the early phase data and the late phase data, the TDL loop error detector repeatedly calculates energies of the early sample and the late sample at stated periods sequentially rather than simultaneously, resulting in degradation of balance between the data samples. As a result, an S-curve of the tracking loop leans to one side according to the balance property. To correct these defects, the DDL structure has been proposed. However, the DDL structure increases the hardware complexity undesirably.

SUMMARY OF THE INVENTION

It is, therefore, an object of the present invention to provide a DDL loop error detector with reduced hardware complexity, capable of replacing the TDL loop error detector.

To achieve the above and other objects, a loop error detector in a PN code timing tracking loop is provided in accordance with the present invention. In the loop error detector, a first multiplexer receives an early I-channel signal and an early Q-channel signal, and alternately selects the received early I and Q-channel signals at a ½-chip period. A first accumulator accumulates the early I and Q-channel signals multiplexed by the first multiplexer for a specific chip period. A second multiplexer receives a late I-channel signal and a late Q-channel signal, and alternately selects the received late I and Q-channel signals at a ½-chip period. A second accumulator accumulates the late I and Q-channel signals multiplexed by the second multiplexer for the specific chip period. An operator calculates a sum and a difference of the early and late I-channel signals accumulated by the first and second accumulators, calculates a sum and a difference of the early and late Q-channel signals, and multiplies the sums by the differences. An adder adds values obtained by multiplying the sums by the differences and outputs the added value as a loop error signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 4:
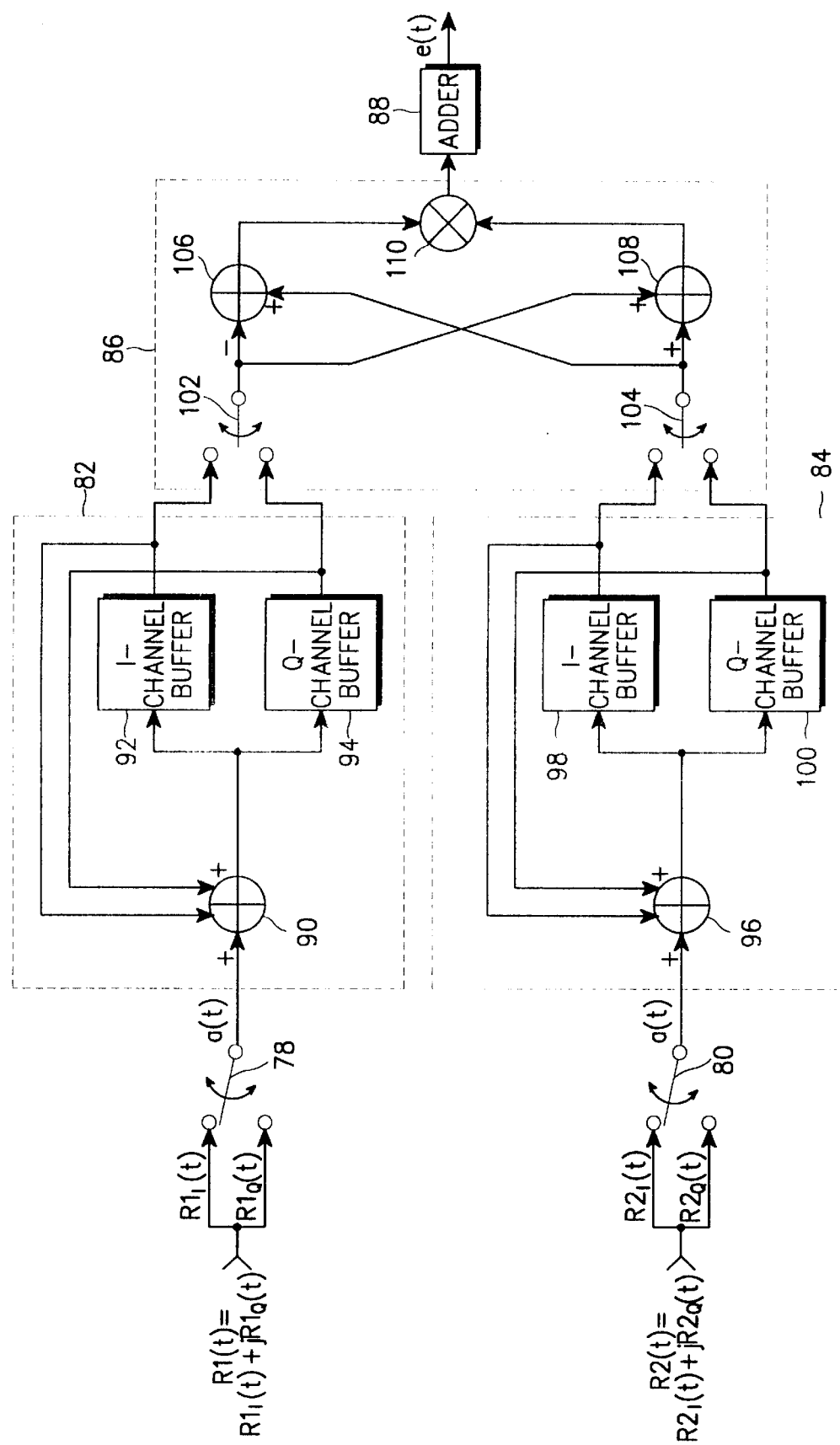
FIG. 4 is a block diagram illustrating a loop error detector according to an embodiment of the present invention.

FIG. 4 illustrates a block diagram of a PN code timing tracking loop according to an embodiment of the present invention. Referring to FIG. 4, a multiplexer 78 alternately selects the early I and Q-channel signals $R1_I(t)$ and $R1_Q(t)$ at the ½-chip period. An accumulator 82 accumulates the early I and Q-channel signal values output from the multiplexer 78. A multiplexer 80 alternately selects the late I and Q-channel signals $R2_I(t)$ and $R2_Q(t)$ at the ½-chip period. An accumulator 84 accumulates the late I and Q-channel signal values output from the multiplexer 80. An operator 86 multiplies the sum of the early I and Q-channel signal values accumulated by the accumulator 82 and the late I and Q-channel signal values accumulated by the accumulator 84, by the difference between early I and Q-channel signal values and the late I and Q-channel signal values. An adder 88 adds the output values of the operator 86 and provides the added value as a loop error signal e(t).

The loop error detector of FIG. 4 has a structure modified from the common DDL loop error detector. In order to reduce the hardware complexity, the data paths for processing the I and Q channels in parallel share one hardware structure. The loop error detector of FIG. 4 is modified from the loop error detector 54 of FIG. 3, comprised of the N-chip accumulators 56–62, the squarers 64–70 and the adders 72 and 74, applied to the despread signals $R1_I(t)$, $R1_Q(t)$, $R2_I(t)$ and $R2_Q(t)$.

Figure 1:
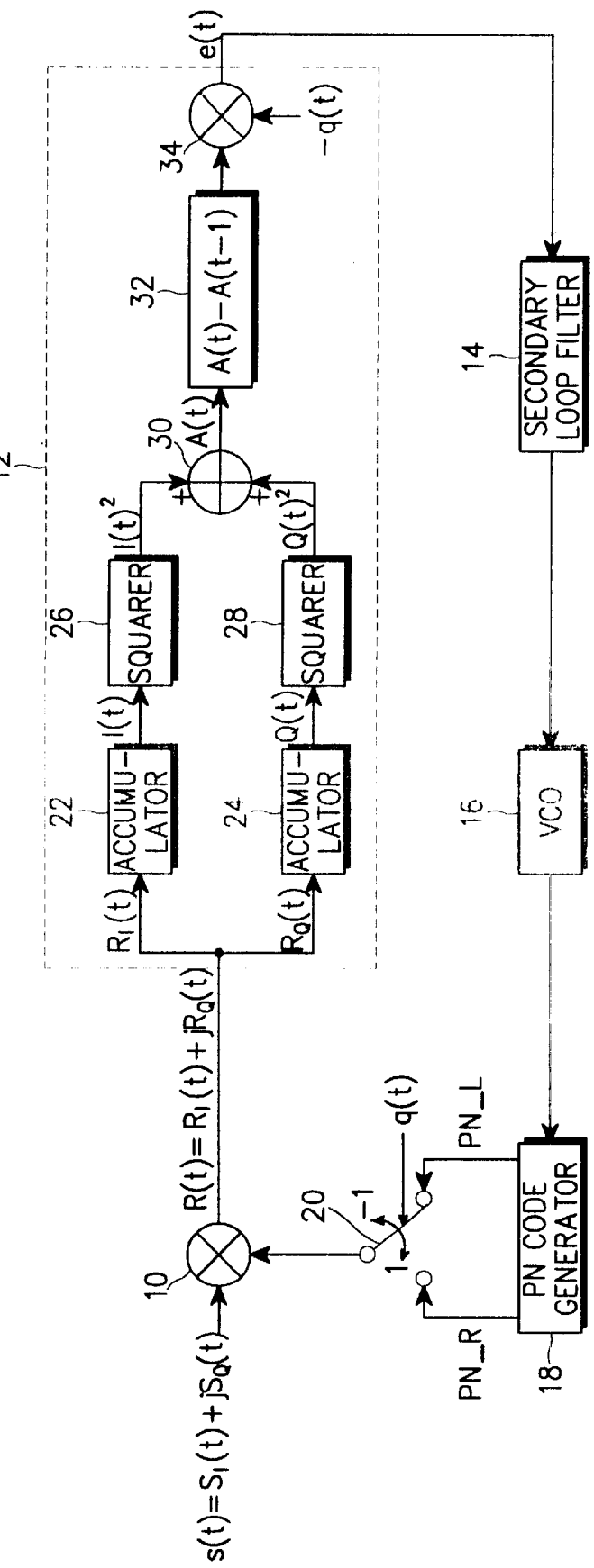
FIG. 1 is a block diagram illustrating a conventional PN code timing tracking loop having a TDL structure.
Figure 2:
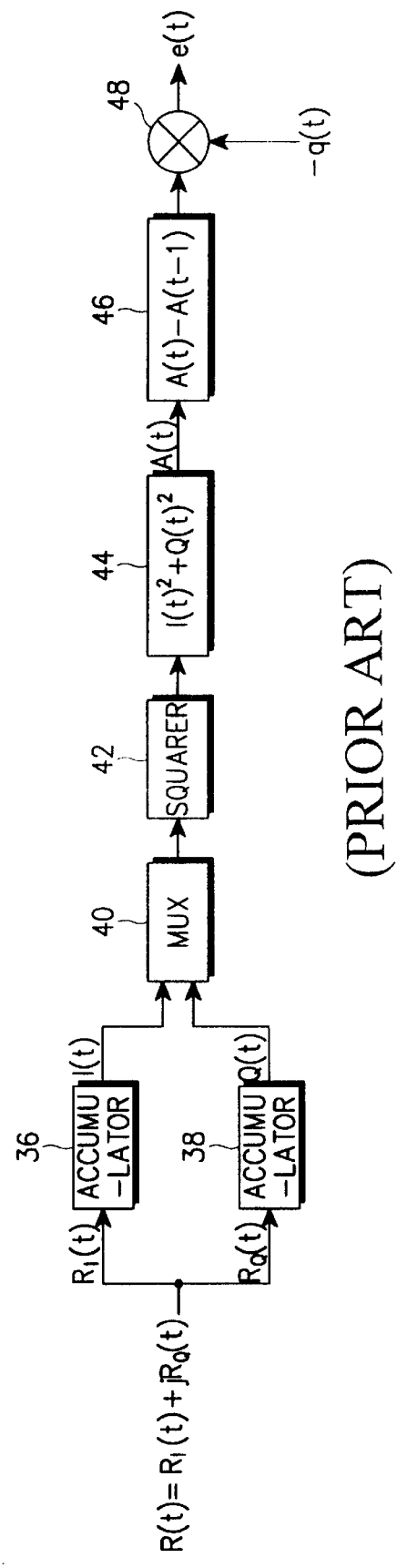
FIG. 2 is a block diagram illustrating a conventional TDL loop error detector.
Figure 3:
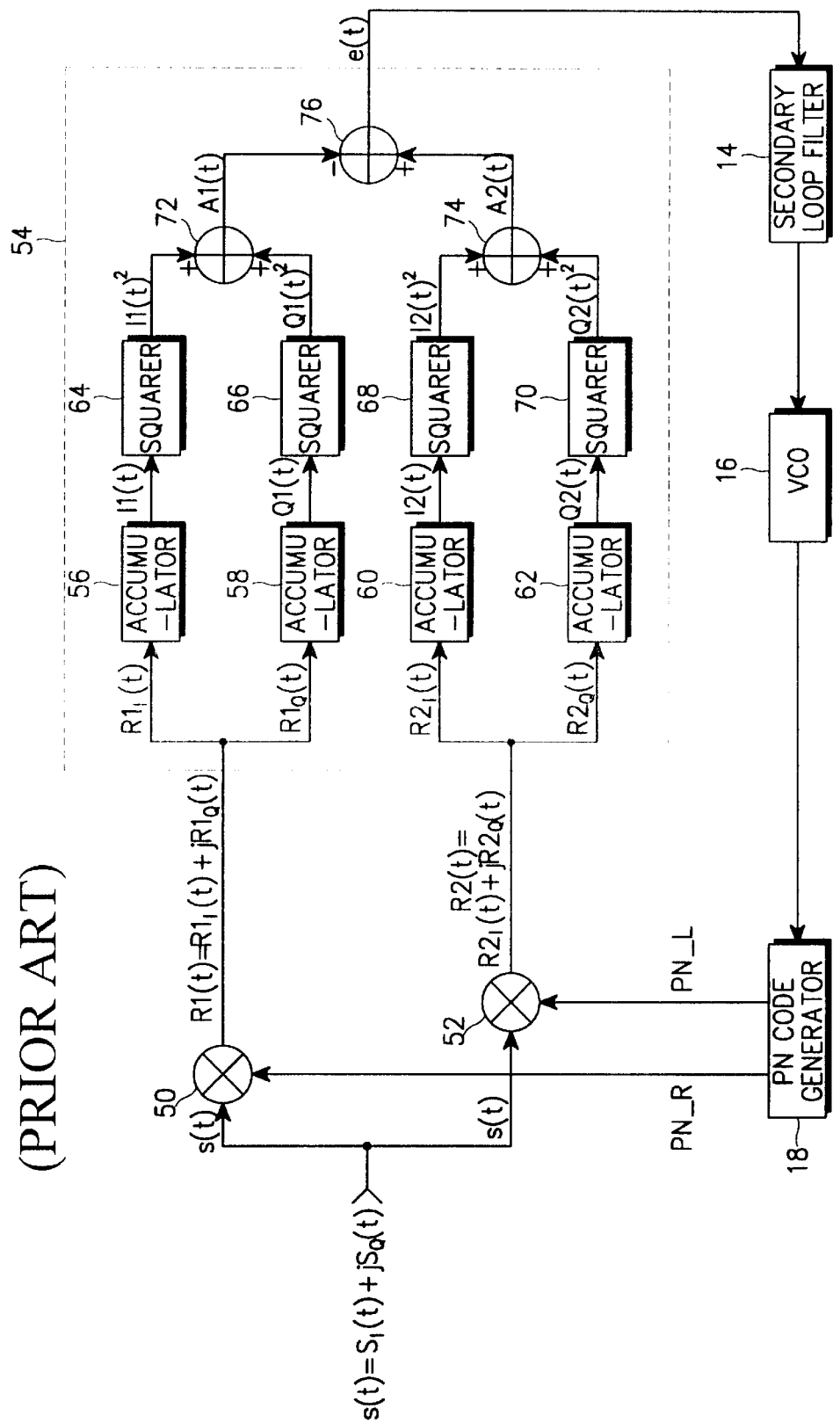
FIG. 3 is a block diagram illustrating a conventional DDL timing loop tracker.

In FIG. 4, the signals $R1_I(t)$ and $R1_Q(t)$ are calculated at every chip and are multiplexed at the ½-chip period. The multiplexer 78 creates a signal a(t) by selecting the signal $R1_I(t)$ in the leading ½-chip period of every chip and the signal $R1_Q(t)$ in the following ½-chip period. Upon receipt of the multiplexed signals, the accumulator 82 accumulates the signal $R1_I(t)$ received for the leading ½-chip period and the signal $R1_Q(t)$ received for the following ½-chip period in I and Q-channel buffers 92 and 94, respectively, for an N-chip period. The I and Q-channel buffers 92 and 94 are provided to calculate the signals I1(t) and Q1(t) of FIG. 3, and are cleared in a unit of N chips (or at a period of N chips). For the leading ½-chip period of every chip, the value R1(t) accumulated in the I-channel buffer 92 is added to the input value a(t) by an adder 90 and then stored again in the I-channel buffer 92. In the following ½-chip period, the value $R1_Q(t)$ accumulated in the Q-channel buffer 94 is added to the input value a(t) by the adder 90 and then stored again in the Q-channel buffer 94. If such accumulation is performed for the N-chip period, the values stored in the I and Q-channel buffers 90 and 92 will be equal to I1(t) and Q1(t), respectively. It is noted that the two accumulators 56 and 58 of FIG. 3 are simplified into a hardware structure comprised of the multiplexer 78, the I and Q-channel buffers 92 and 94, and the adder 90. The accumulators having the complicated hardware structure are replaced with the multiplexer, the buffers and the adder, which have simple hardware structures.

Similarly, the signals $R2_I(t)$ and $R2_Q(t)$ calculated at every chip are multiplexed at the ½-chip period. The multiplexer 80 creates a signal a(t) by selecting the signal $R2_I(t)$ in the leading ½-chip period of every chip and the signal $R2_Q(t)$ in the following ½-chip period. Upon receipt of the multiplexed signals, the accumulator 84 accumulates the signal $R2_I(t)$ received for the leading ½-chip period and the signal $R2_Q(t)$ received for the following ½-chip period in I and Q-channel buffers 98 and 100, respectively, for an N-chip period. The I and Q-channel buffers 98 and 100 are provided to calculate the signals I2(t) and Q2(t) of FIG. 3, and are cleared in a unit of N chips (or at a period of N chips). For the leading ½-chip period of every chip, the value $R2_I(t)$ accumulated in the I-channel buffer 98 is added to the input value a(t) by an adder 96 and then stored again in the I-channel buffer 98. In the following ½-chip period, the value $R2_Q(t)$ accumulated in the Q-channel buffer 100 is added to the input value a(t) by the adder 96 and then stored again in the Q-channel buffer 100. If such accumulation is performed for the N-chip period, the values stored in the I and Q-channel buffers 98 and 100 will be equal to I2(t) and Q2(t), respectively. It is noted that the two accumulators 60 and 62 of FIG. 3 are simplified into a hardware structure comprised of the multiplexer 80, the I and Q-channel buffers 98 and 100, and the adder 96. The accumulators having the complicated hardware structure are replaced with the multiplexer, the buffers and the adder, which have simple hardware structures.

The resultant values of the accumulator 82 are stored in the I and Q-channel buffers 92 and 94, and the resultant values of the accumulator 84 are stored in the I and Q-channel buffers 98 and 100. The values stored in the buffers 92, 94, 98 and 100 are used by the operator 86 at the N-chip period.

The loop error signal e(t) can be calculated by Equation (4) below and can be changed as shown by Equation (5) below.

$$e(t) = \{I2(t)^2 + Q2(t)^2\} - \{I1(t)^2 + Q1(t)^2\} \quad (4)$$

$$\begin{aligned} e(t) &= \{I2(t)^2 + Q2(t)^2\} - \{I1(t)^2 + Q1(t)^2\} \\ &= \{I2(t) + I1(t)\} \cdot \{I2(t) - I1(t)\} + \{Q2(t) + Q1(t)\} \cdot \{Q2(t) - Q1(t)\} \end{aligned} \quad (5)$$

In view of the fact that Equation (4) can be changed to Equation (5), the operator 86 performs addition/subtraction before multiplication as illustrated in FIG. 4 rather than performing addition after squaring as illustrated in FIG. 3. Out of the values I1(t), Q1(t), I2(t) and Q2(t) stored in the buffers 92, 94, 98 and 100, the values I1(t) and I2(t) are first selected by selectors 102 and 104. Then, a subtracter 106, an adder 108 and a multiplier 110 operate on the selected values and output {I2(t)+I1(t)}·{I2(t)−I1(t)}. Specifically, the subtracter 106 calculates {I2(t)−I1(t)}, the adder 108 calculates {I2(t)+I1(t)}, and the multiplier 110 multiplies the two resultant values. After calculating {I2(t)+I1(t)}·{I2(t)−I1(t)}, the operator 86 calculates {Q2(t)+Q1(t)}·{Q2(t)−Q1(t)} in the same method. Such operation is preferably performed within N chips. The adder 88 calculates the loop error signal e(t) by adding calculated values. Therefore, the hardware structure of FIG. 3, comprised of the four squarers 64–70, the two adders 72 and 74, and the one adder 76, can be simplified into the hardware structure comprised of the subtracter 106, the adder 108 and the multiplier 110. It is possible to use the subtracter and the adder having a simple hardware structure rather than using the squarers having a complicated hardware structure.

Therefore, it is possible to provide a DDL loop error detector with reduced hardware complexity, having the improved noise-suppression capability.

As described above, the invention can provide a DDL loop error detector with reduced hardware complexity, capable of replacing the TDL loop error detector.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A loop error detector in a PN (Pseudo Noise) code timing tracking loop, comprising:

a first multiplexer for receiving an early I-channel signal and an early Q-channel signal, and alternately selecting the received early I and Q-channel signals at a ½-chip period;

a first accumulator for accumulating the early I and Q-channel signals multiplexed by the first multiplexer for a specific chip period;

a second multiplexer for receiving a late I-channel signal and a late Q-channel signal, and alternately selecting the received late I and Q-channel signals at a ½-chip period;

a second accumulator for accumulating the late I and Q-channel signals multiplexed by the second multiplexer for the specific chip period;

an operator for calculating a sum and a difference of the early and late I-channel signals accumulated by the first and second accumulators, calculating a sum and a difference of the early and late Q-channel signals, and multiplying the sums by the differences; and an adder for adding values obtained by multiplying the sums by the differences and outputting the added value as a loop error signal.

2. A loop error detector in a PN code timing tracking loop, comprising:

a first multiplexer for receiving an early I-channel signal and an early Q-channel signal, and alternately selecting the received early I and Q-channel signals at a ½-chip period;

a first I-channel buffer for accumulating the I-channel signal output from the first multiplexer for a specific chip period;

a first Q-channel buffer for accumulating the Q-channel signal output from the first multiplexer for the specific chip period;

a first adder for alternately adding the early I and Q-channel signals output from the first multiplexer to the signal values stored in the first I and Q-channel buffers at the ½-chip period, and storing the added early I and Q-channel signals in the first I and Q-channel buffers, respectively;

a second multiplexer for receiving a late I-channel signal and a late Q-channel signal, and alternately selecting the received late I and Q-channel signals at the ½-chip period;

a second I-channel buffer for accumulating the I-channel signal output from the second multiplexer for the specific chip period;

a second Q-channel buffer for accumulating the Q-channel signal output from the second multiplexer for the specific chip period;

a second adder for alternately adding the late I and Q-channel signals output from the second multiplexer to the signal values stored in the second I and Q-channel buffers at the ½-chip period, and storing the added late I and Q-channel signals in the second I and Q-channel buffers, respectively;

a first selector for alternately selecting the early I and Q-channel signal values stored in the first I and Q-channel buffers for first and second periods, respectively;

a second selector for alternately selecting the late I and Q-channel signal values stored in the second I and Q-channel buffers for first and second periods, respectively;

a subtracter for calculating a difference between the late I-channel signal value output from the second selector for the first period and the early I-channel signal value output from the first selector for the first period, and calculating a difference between the late Q-channel signal value output from the second selector for the second period and the early Q-channel signal value output from the first selector for the second period;

a third adder for calculating a sum of the late I-channel signal value output from the second selector for the first period and the early I-channel signal value output from the first selector for the first period, and calculating a sum of the late Q-channel signal value output from the second selector for the second period and the early Q-channel signal value output from the first selector for the second period;

a multiplier for multiplying the sum of the early I-channel signal value and the late I-channel signal value by the difference between the early I-channel signal value and the late I-channel signal value for the first period, and multiplying the sum of the early Q-channel signal value and the late Q-channel signal value by the difference between the early Q-channel signal value and the late Q-channel signal value for the second period; and a fourth adder for adding a value output from the multiplier for the first period to a value output from the multiplier for the second period and outputting the added value as a loop error signal.

* * * * *